United States Patent [19]

Fahim et al.

[11] Patent Number: 4,489,792

[45] Date of Patent: Dec. 25, 1984

[54] HAMMER DRILL ADAPTER

[76] Inventors: Atef E. F. Fahim, 2125 St. Marc St., Apt. 1108, Montreal, P.Q., Canada; Rock S. Y. Lee, 5910 Terrace Beausejour, St. Hubert, P.Q., Canada; Richard M. H. Cheng, 3452 Rosedale Ave., Notre-Dame-de-Grace, P.Q., Canada

[21] Appl. No.: 268,053

[22] Filed: May 28, 1981

[51] Int. Cl.3 .......................... E02D 7/02; F16H 37/16

[52] U.S. Cl. ....................................... 173/48; 74/22 A

[58] Field of Search ............... 74/22 R, 22 A; 173/13, 173/47, 48, 109

[56] References Cited

U.S. PATENT DOCUMENTS

| | | | |
|---|---|---|---|
| 2,223,727 | 12/1940 | Homen | 173/48 |
| 3,161,241 | 12/1964 | Allen et al. | 173/48 |
| 3,430,707 | 3/1969 | Rees | 173/48 |
| 3,789,933 | 2/1974 | Jarecki | 173/48 |
| 3,809,168 | 5/1974 | Fromm | 173/13 |
| 4,229,981 | 10/1980 | Macry | 173/48 |
| 4,274,304 | 6/1981 | Curtiss | 173/48 |

*Primary Examiner*—Lawrence J. Staab
*Attorney, Agent, or Firm*—Oblon, Fisher, Spivak, McClelland & Maier

[57] ABSTRACT

An adapter device for securement to an output rotary drive of a drill. The adapter comprises a housing having an input connector securable to the rotary drive, and an output connector. A fixed mode cam is immovably secured with respect to the housing. A displaceable floating cam is provided intermediate the input connector and a displaceable keying element. The floating cam is displaceable in and out of engagement with the input keying element. An adjusting assembly is provided to displace the keying element in and out of engagement with the fixed mode cam and the floating cam whereby the input connector can impart a rotary drive, rotary drive and impact forces or impact forces only to the output connector.

16 Claims, 5 Drawing Figures

HAMMER DRILL ADAPTER

BACKGROUND OF INVENTION (a) Field of the Invention

The present invention relates to an adapter device for securement to the output rotary drive of a drill whereby to impart a rotary, rotary and impact, or an impact force only to a bit secured to the adapter.

(b) Description of Prior Art

Adapters are known to generate percussion forces to a drilling bit such as that disclosed in U.S. Pat. No. 3,149,681. In this patent, the adapter is mountable on a power drill to produce rotation only or a combined rotation and hammering. To add the hammering only mode of operation, it would be necessary to completely redesign the concept of the cam, the input connector, and the output connector. The cam in the aforementioned patent allows only one direction of rotation. Also, a ball-type cam follower is used and it has the disadvantage of point loading which results in excessive wear, and is not suitable for applications involving impact loads.

Another disadvantage of prior art, such as the patent mentioned above, is that the impact strength is achieved by positioning an adjusting device to obtain a certain impact force. Thus, a constant impact force is obtained and the user is not in full and immediate control over the hammering function of the adapter. There is a need to provide impact strength by simply varying the pressure applied on the tool by the user, which need is provided by Applicant's invention.

In the prior art, either two types of cams are generally used, (a) the unidirectional impact type similar to the one used in the above-referred to patent and (b) the bi-directional reciprocating type. The former of the two cams is unidirectional and as such cannot be used in drills capable of reverse rotation. The latter, although bi-directional, produces reciprocating action rather than crisp impacts.

It is a feature of the present invention to substantially overcome the above disadvantages of the prior art and to provide an adapter which is capable of producing a rotary, rotary and impact, or impact forces only, on a bit secured thereto.

According to a further feature of the present invention, there is provided an adapter device for securement to an output rotary drive of a drill and wherein the user varies the impact strength by simply varying the pressure he applies on the drill.

Another feature of the present invention is to provide an adapter device for securement to an output rotary drive of a drill and which is capable of providing a hammering only mode to extend the use of the adapter to other applications like chiseling and general impacting applicators (i.e. hammering).

Another feature of the present invention is to provide an adapter device for securement to an output rotary drive of a drill and which adapter comprises a bi-directional true impact cam.

Another feature of the present invention is to provide an adapter device which is relatively simple to construct, use and repair.

According to the above features, from a broad aspect, the present invention provides an adapter device for securement to an output rotary drive of a drill. The adapter comprises a housing having an input connection means securable to the rotary drive. An output connector is also provided. A fixed mode cam is immovably secured with respect to the housing. A displaceable floating cam is provided intermediate the input connection means and a displaceable keying element. The floating cam is displaceable in and out of engagement with the keying element. Selective adjustment means is provided to displace the keying element in and out of engagement with the fixed mode cam and the floating cam whereby the input connection means can impart a rotary, rotary and impact, or impact forces to the output connector.

BRIEF DESCRIPTION OF DRAWINGS

A preferred embodiment of the present invention will now be described with reference to the accompanying drawings in which.

DESCRIPTION OF PREFERRED EMBODIMENTS

Figure 1:
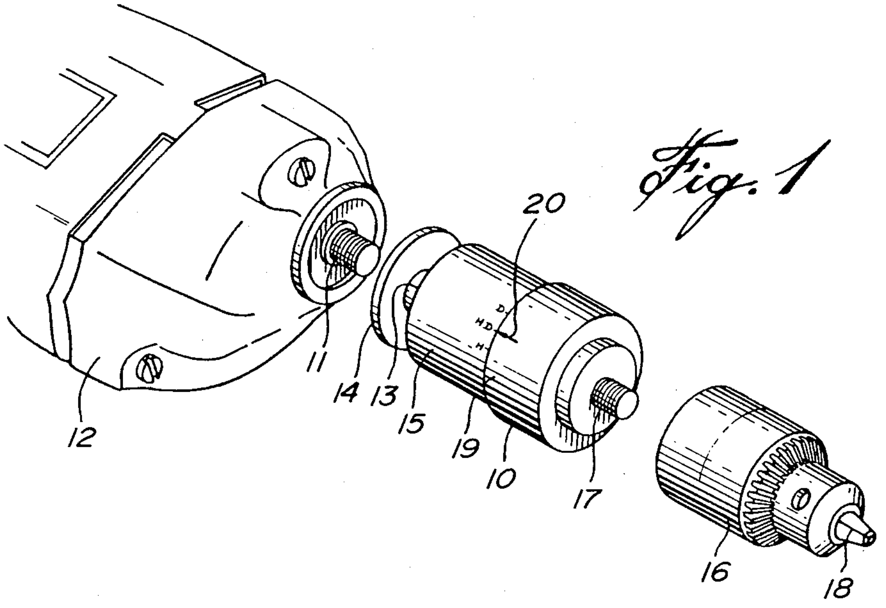
FIG. 1 is a perspective view, partly fragmented, showing the adapter of the present invention securable to the rotary drive of a drill.

Referring to the drawings, and more particularly to FIG. 1, there is shown at 10, the adapter of the present invention securable to a rotary drive 11 of a drill 12. The adapter is provided with an input connection means, herein a threaded shaft 13 securable to the rotary drive 11. Friction washer 14 is secured intermediate the adapter housing 15 and the drill 12 about the shaft 13. The conventional drill chuck 16 is secured to an output drive 17 of the adapter 10, to impart rotation to the drill chuck 16 and a bit (not shown) secured within the end clamp 18 of the chuck.

Figure 2:
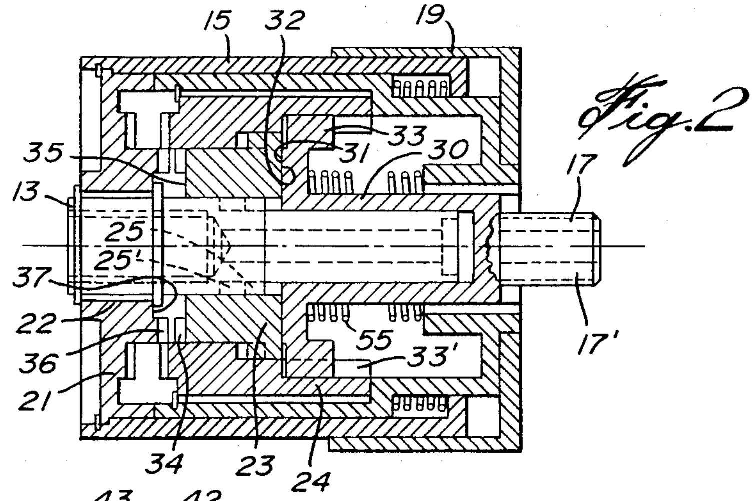
FIG. 2 is a sectional view of the adapter of the present invention illustrating the drilling mode of the adapter.
Figure 3:
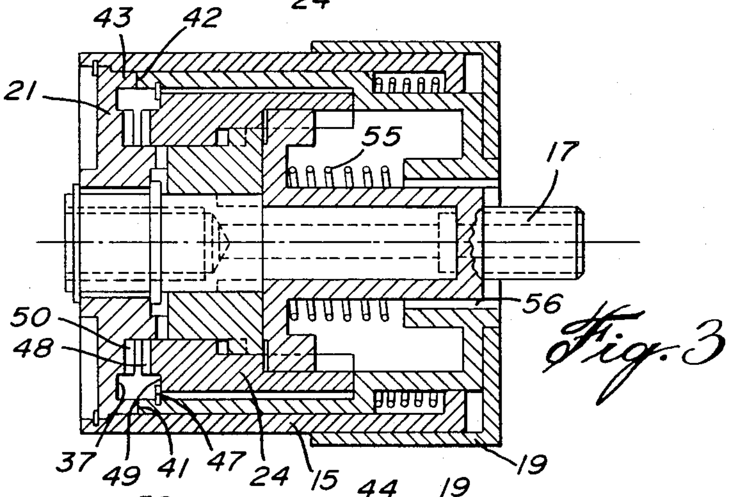
FIG. 3 is a sectional view of the adapter of the present invention illustrating the hammering and drilling modes of the adapter.
Figure 4:
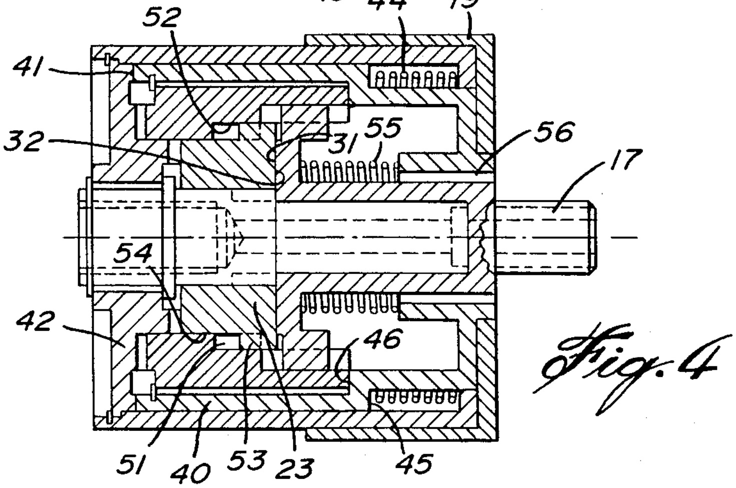
FIG. 4 is a sectional view of the adapter of the present invention showing the hammering mode of the adapter.

Referring now additionally to FIGS. 2, 3 and 4, there is shown the adapter device 10 and its constituent parts in their various mode positions. The adapter is provided with a selector dial 19 which selects the three modes of operation of the adapter and namely a rotary drive only mode, a rotary drive and impact forces mode, or an impact forces only mode. These modes are selected by rotating the dial 19 and aligning the various modes selecting markings 20 with a position indicator, as shown in FIG. 1.

The adapter device 10 is provided with a fixed mode cam 21 which is an annular cam immovably secured to the housing 15. The input shaft 13 which could also be provided with a threaded post (as shown in FIG. 1) is mounted on a brass bearing 22 for axial rotation within the fixed cam 21. A displaceable floating cam 23, herein also an annular cam is located about the input shaft intermediate the shaft and a displaceable keying element 24. The floating cam is secured to the input shaft 13 by keys 25 within key-ways 25' whereby rotational drive is imparted to the floating cam 23 when the input shaft 13 is rotated. However, the floating cam 23 is displaceable axially about the shaft 13. The displaceable keying element is also an annular element displaceable axially about the input shaft 13 and the floating cam 23. The keying element 24 is displaced by rotational displacement selection of the selector dial 19 causing the keying element to move in and out of engagement with the fixed mode cam 21 and the floating cam 23 as will be described hereinbelow, whereby the rotational drive of the input shaft can impart a rotary drive, rotary drive and impact forces or impact forces only to the output drive connector.

The output drive connector 17 is provided with a connector element, herein a threaded post 17' or else it could be a threaded bore (as shown in FIG. 1) for securing a chuck 16 or other suitable element thereto. The output drive connector 17 also comprises a translatory member portion 30 having an annular end wall 31 biased in contact with an end wall 32 of the floating cam 23 to transmit the impact forces or percussions to the output drive connector 17. The translatory member 30 is also slidably coupled to the keying element 24 by means of keys 33 and key-ways 33' whereby the keying element 24 can transmit a rotational drive to the output connector 17.

As previously described, the floating cam 23 is continuously connected to the input shaft 13 and rotatable therewith. The floating cam is also provided with a toothed ring 34 on a front wall 35 thereof and the toothed ring 34 is movable in and out of engagement with a first toothed circumferential ring 36 on an inner wall 37 of the fixed mode cam 21. Each tooth of both the toothed rings have an engageable sloping wall 38 (similar to that in FIG. 5) and an abrupt vertical release wall 39 to impart crisp impact forces for reciprocating displacement of the output connector 17.

The selector dial 19 forms part of a selective adjustment means which also comprises a keying element support member 40 having a cam follower end 41 biased in frictional contact on a cam surface 42 of a peripheral protrusion 43 of the fixed mode cam 21 whereby to cause axial displacement of the support member 40 relative to the housing 15 to axially displace the keying element 24 and the floating cam 23 in and out of engagement with the fixed mode cam 21 and further to cause engagement and disengagement between the floating cam 23 and the keying element 24. The cam surface 42 is provided with at least two sloping cam sections with the cam follower 41 biased thereagainst by means of biasing coil spring 44 acting against a shoulder 45 of the support member 40. The keying element 24 is an annular type member movably secured to the support member between the shoulder 46 and a retaining ring 47. Thus, as the support member 40 is displaced axially relative to the housing 15 and the input shaft 13 the keying element 24 is also displaced.

Arresting means, herein a toothed ring 48 is provided on a front face 49 of the keying element 24 for locking engagement with a toothed ring 50 on the inner wall 37 of the fixed cam 21 below the first toothed circumferential ring 36. When the toothed rings 48 and 50 are in engagement, as shown in FIG. 4, the selector dial has displaced the support member 40 to the lowermost part of the cam surface 42 and no rotational drive will be transmitted to the output drive 17 as the floating cam 23 has been disengaged with the keying element 24. Their engagement is provided by an engagement means constituted by an annular toothed ring 51 provided on an inner wall 52 of the keying element and an annular toothed ring 52 provided about an outer wall 54 of the floating cam 23. When these are disengaged the rotary drive of the shaft 13 will not be connected to the keying element which will remain stationary. However, the toothed ring 34 of the floating cam and the toothed ring 36 of the fixed cam are engaged and the rotation of the floating cam will cause the output drive shaft connector 17 to be subjected to impact forces produced by rotating the toothed ring 34 over the fixed toothed ring 36. The coil spring 55 biases the end wall 31 continuously against the end wall 32 of the floating cam and transmits the impact or percussion forces to the connector 17. The output connector 17 is also captive in a brass bearing 56 for rotational displacement with respect to the housing 15.

Figure 5:
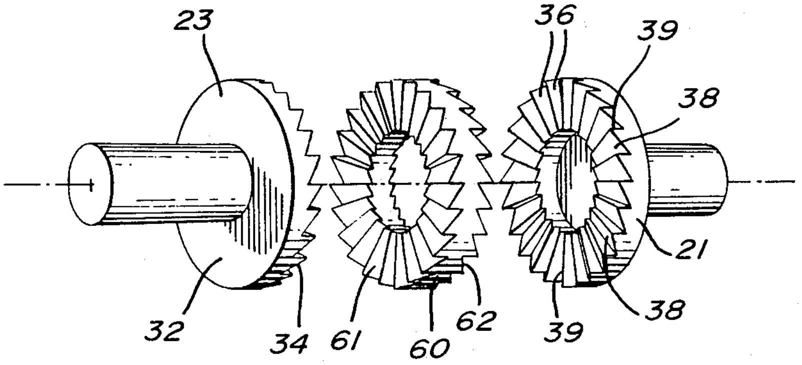
FIG. 5 is a perspective exploded view showing a modification of the adapter including an idler cam to provide a bi-directional drive.

Referring now to FIG. 5, there is shown the provision of an idler cam 60 which is positioned about the input shaft 13 and intermediate the fixed mode cam 21, (herein a portion thereof only shown with the toothed circumferential ring 36) and the floating cam 23 (also herein a portion only being shown that having the toothed ring 34). The idler cam is an annular cam having a sawtooth annular face 61 and 62 on opposed vertical faces thereof with the teeth on opposed faces extending in the same direction. The teeth of all of the toothed rings, are identical in shape whereby to transmit the aforementioned crisp impact forces or percussion to the output connector 17. Although not shown, all of the cams 21, 23 and 60 are spring biased against each other by means of the coil spring 55, previously described.

It is noted also that the teeth 34 and 36 of the cams 23 and 21 respectively face in the opposite direction as the teeth 61 and 62 on the oppose vertical walls of the idler cam 60. Thus, because the cams are biased in frictional contact together by the coil spring 55, as the input shaft and floating cam 23 is rotated counterclockwise, the teeth 62 of the idler cam will engage with the teeth 36 of the fixed cam 61 and the idler cam 60 will be stationary. The floating cam 23 will rotate and the teeth 34 will move up and down on the teeth 61 causing crisp impacts to be translated to the output drive connector 17 via the end wall 32 of the floating cam 23. If the drive of the input shaft 13 is counter-clockwise, then the teeth 61 of the idler cam 60 will engage with the teeth 34 on the floating cam 23 and the impact forces will be provided between the teeth 62 riding up and down on the teeth 36 of the fixed cam 21. Thus, the provision of the idler cam 60 is to provide crisp impacts forces or percussion forces in either a clockwise or counterclockwise rotation of the input shaft 13 of the connector.

It is within the ambit of the present invention to cover any obvious modifications of the preferred embodiment described herein, provided such modifications fall within the scope of the appended claims.

We claim:

1. An adapter device for securement to an output rotary drive of a drill, said adapter comprising a housing having an input shaft supported for axial rotation in said housing and having a connectable end for securement to said rotary drive, an output connector, said input shaft and said output connector being disposed on a common axis, a fixed mode cam immovably secured with respect to said housing and comprising a sloped cam surface and a first toothed circumferential ring, an annular floating cam in sliding non-rotational engagement with and about said input shaft, said floating cam comprising a toothed ring engageable with said first toothed ring of said fixed mode cam, an annular keying element disposed about said floating cam and in engagement with said output connector, said keying element being displaceable in and out of engagement with said floating cam and also displaceable so as to be substantially radially adjacent to said first toothed ring of said fixed mode cam, and selective adjustment means for cooperating with said sloped cam surface to displace said keying element in and out of engagement with said fixed mode cam and said floating cam, wherein said input shaft can impart a rotary drive, rotary drive and impact forces or impact forces only to said output connector and wherein said first toothed ring of said fixed mode cam and said toothed ring of said floating cam together comprise means for creating said impact forces during said engagement thereof.

2. An adapter device as claimed in claim 1, wherein said output connect or is biased in friction contact with an end wall of said floating cam for transmission of impact forces to said output connector from said floating cam.

3. An adapter device as claimed in claim 2, wherein each tooth of both said toothed ring of said floating cam and said first toothed ring of said fixed mode cam comprises an engageable sloping wall and a release vertical wall to impart crisp impact forces for reciprocating displacement of said output connector.

4. An adapter device as claimed in claim 3, wherein said output connector is provided with a connector element for securing a chuck thereto, and a translatory member portion having an annular end wall biased in contact with said end wall of said floating cam to transmit said impact forces, said translatory member also being slidably coupled to said keying element to transmit a rotational drive to said connector element.

5. An adapter device as claimed in claim 1, wherein said selective adjustment means is an adjusting assembly comprising a keying element support member having a cam follower end biased in frictional contact on said sloped cam surface of said fixed mode cam to cause axial displacement of said support member relative to said housing whereby to axially displace said keying element and said floating cam in and out of engagement with said fixed mode cam and further to cause engagement and disengagement between said floating cam and said keying element.

6. An adapter device as claimed in claim 5, wherein said adjusting assembly further comprises a selector dial causing relative rotational displacement between said keying element support member and said fixed mode cam to cause said axial displacement of said support member.

7. An adapter device as claimed in claim 6, wherein said fixed mode cam is an annular cam having a circular projecting cam wall comprising said sloped cam surface, said cam follower end of said support member riding in friction contact on said sloped cam surface and biased thereagainst by spring means.

8. An adapter device as claimed in claim 5, wherein said keying element is an annular type member secured to said support member and further comprises arresting means on a front face of said keying element for locking engagement with said fixed mode cam when said keying element is biased therewith when said cam follower end of said support member is positioned on a lowermost part of said sloped cam surface of said fixed mode cam.

9. An adapter device as claimed in claim 8, wherein said keying element is further provided with floating cam engagement means to cause rotational displacement of said keying element when in engagement with said floating cam, said engagement means being disengaged when said arresting means of said keying element is in locking engagement with said fixed mode cam.

10. An adapter device as claimed in claim 9, wherein said output connector is biased in friction contact with an end wall of said floating cam to translate impact forces to said output connector from said floating cam.

11. An adpater device as claimed in claim 10, wherein each tooth of both said toothed ring of said floating cam and said first toothed ring of said fixed mode cam comprises an engageable sloping wall and a release vertical wall to impart crisp impact forces for reciprocating displacement of said output connector.

12. An adapter device as claimed in claim 8, wherein said arresting means of said keying element is an annular toothed surface for locking engagement with a second annular toothed surface projecting from a rear face of said fixed mode cam.

13. An adapter device as claimed in claim 9, wherein said engagement means is an annular recess in a portion of an inner wall of said annular ring-type keying element, said annular recess having a toothed end wall for engagement with a toothed end wall of an annular projection about said floating cam.

14. An adapter device as claimed in claim 1, wherein there is further provided an idler cam intermediate said fixed mode cam and said floating cam, all of said cams being annular cams, said idler cam having a sawtooth annular face on opposed faces thereof with the sawteeth on said opposed faces extending in the same circumferential direction, said fixed mode cam and floating cam having each a sawtooth annular face opposite a respective one of said opposed faces of said idler cam, all of said sawtooth annular faces of said cams being spring biased against each other, said teeth of said fixed mode cam and floating cam extending in the opposite circumferential direction to said teeth in their respective opposed faces of said idler cam.

15. An adapter device as claimed in claim 14, wherein said idler cam is in toothed engagement with said fixed mode cam when said floating cam is rotated in a first direction by said input shaft with said opposed teeth of said floating cam and idler cam generating impact motion to produce said impact forces.

16. An adapter device as claimed in claim 15, wherein said idler cam is in toothed engagement with said floating cam when said floating cam is rotated in a reverse direction to said first direction by said input shaft with said opposed teeth of said idler cam and said fixed mode cam generating impact motion to produce said impact forces.

* * * * *